(12) United States Patent
Lewis et al.

(10) Patent No.: US 10,207,754 B2
(45) Date of Patent: Feb. 19, 2019

(54) TRACK SYSTEM FOR A WORK VEHICLE

(71) Applicant: CNH Industrial America LLC, New Holland, PA (US)

(72) Inventors: Brady Dorr Lewis, Peck, KS (US); Emory L. Frey, Clearwater, KS (US); John M. Moffitt, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/451,072

(22) Filed: Mar. 6, 2017

(65) Prior Publication Data
US 2018/0251169 A1 Sep. 6, 2018

(51) Int. Cl.
| | | |
|---|---|---|
| *B62D 55/13* | (2006.01) |
| *B62D 55/084* | (2006.01) |
| *B62D 55/125* | (2006.01) |
| *B62D 55/24* | (2006.01) |
| *B62D 55/20* | (2006.01) |
| *B62D 55/14* | (2006.01) |
| *E02F 9/02* | (2006.01) |
| *E02F 3/76* | (2006.01) |
| *B62D 55/06* | (2006.01) |

(52) U.S. Cl.
CPC ......... *B62D 55/084* (2013.01); *B62D 55/125* (2013.01); *B62D 55/13* (2013.01); *B62D 55/14* (2013.01); *B62D 55/202* (2013.01); *B62D 55/244* (2013.01); *E02F 9/02* (2013.01); *B62D 55/06* (2013.01); *E02F 3/7609* (2013.01)

(58) Field of Classification Search
CPC ...... B62D 55/13; B62D 55/28; B62D 55/286; B62D 55/08; B62D 55/12; B62D 55/18; B62D 55/202; B60F 3/0015
USPC .................. 180/9.21, 9.62; 440/12.56, 12.63; 305/169, 193, 195, 199
See application file for complete search history.

(56) References Cited

U.S. PATENT DOCUMENTS

| | | | | |
|---|---|---|---|---|
| 2,397,104 A | * | 3/1946 | Hait | B60F 3/0015 305/130 |
| 3,773,128 A | | 11/1973 | Bowen et al. | |
| 3,872,939 A | | 3/1975 | Eckert | |
| 5,368,375 A | * | 11/1994 | Gustafson | B62D 55/305 305/143 |
| 5,368,376 A | * | 11/1994 | Edwards | B62D 55/24 305/167 |

(Continued)

*Primary Examiner* — Joseph M Rocca
*Assistant Examiner* — Daniel S Yeagley
(74) *Attorney, Agent, or Firm* — Peter K. Zacharias; Patrick M. Sheldrake

(57) ABSTRACT

A track system for a work vehicle includes a first sprocket having a first diameter. The first sprocket is configured to be coupled to a drive system of the work vehicle, and the first sprocket is configured to engage a metal track and to drive the metal track in rotation. The track system also includes a second sprocket having a second diameter. The second sprocket is configured to be coupled to the drive system of the work vehicle, and the second sprocket is configured to engage a rubber track and to drive the rubber track in rotation. In addition, the first and second sprockets are configured to engage a mounting system, the mounting system is configured to interchangeably couple the first and second sprockets to the drive system, and the second diameter of the second sprocket is greater than the first diameter of the first sprocket.

19 Claims, 9 Drawing Sheets

(56) References Cited

U.S. PATENT DOCUMENTS

| | | | |
|---|---|---|---|
| 6,869,153 B2* | 3/2005 | Wright | B62D 55/104 |
| | | | 305/165 |
| 2005/0014425 A1* | 1/2005 | Wilson | B60F 3/0015 |
| | | | 440/12.56 |
| 2006/0076168 A1 | 4/2006 | Gaudreault | |
| 2010/0012399 A1* | 1/2010 | Hansen | B62D 55/04 |
| | | | 180/9.26 |
| 2011/0315459 A1* | 12/2011 | Zuchoski | B60W 50/082 |
| | | | 180/9.21 |
| 2015/0136497 A1* | 5/2015 | Morin | B62D 55/04 |
| | | | 180/9.5 |
| 2016/0244948 A1* | 8/2016 | Rauma | B60K 6/46 |
| 2016/0257358 A1* | 9/2016 | Johnson | B62D 55/28 |
| 2017/0280640 A1* | 10/2017 | Hansen | A01G 25/092 |

\* cited by examiner

TRACK SYSTEM FOR A WORK VEHICLE

BACKGROUND

The present disclosure relates generally to a track system for a work vehicle.

Certain work vehicles (e.g., tractors, harvesters, compact track loaders, etc.) include a cab configured to house an operator and a chassis configured to support the cab. The chassis is also configured to support tracks to facilitate movement of the work vehicle relative to a ground surface. Certain work vehicles utilize metal tracks to drive the work vehicle. Metal tracks may have greater longevity and provide more traction than rubber tracks. However, the ground speed of a work vehicle utilizing metal tracks may be limited (e.g., to limit stress on the links between segments of the metal tracks), and the metal tracks may transmit vibrations to the cab of the work vehicle. Other work vehicles utilize rubber tracks to drive the work vehicle. Rubber tracks may enable the work vehicle to move at a higher ground speed than a work vehicle that utilizes metal tracks, and the rubber tracks may absorb vibrations, thereby increasing occupant comfort. However, the longevity and the traction of rubber tracks may be less than the longevity and the traction of metal tracks. Unfortunately, because metal tracks and rubber tracks are typically driven at different speeds and/or because metal tracks and rubber tracks have different interfaces for mounting to wheel assemblies, metal tracks and rubber tracks are typically not interchangeable.

BRIEF DESCRIPTION

In one embodiment, a track system for a work vehicle includes a first sprocket having a first diameter. The first sprocket is configured to be coupled to a drive system of the work vehicle, and the first sprocket is configured to engage a metal track and to drive the metal track in rotation. The track system also includes a second sprocket having a second diameter. The second sprocket is configured to be coupled to the drive system of the work vehicle, and the second sprocket is configured to engage a rubber track and to drive the rubber track in rotation. In addition, the first and second sprockets are configured to engage a mounting system, the mounting system is configured to interchangeably couple the first and second sprockets to the drive system, and the second diameter of the second sprocket is greater than the first diameter of the first sprocket.

In another embodiment, a track system for a work vehicle includes a drive system having a transmission configured to receive a rotational input from a drive motor of the drive system and to provide a rotational output to a sprocket. The transmission is configured to shift between a first gear ratio and a second gear ratio, the first gear ratio is configured to drive the sprocket at a first speed to drive a metal track in rotation, the second gear ratio is configured to drive the sprocket at a second speed to drive a rubber track in rotation, and the first gear ratio is greater than the second gear ratio.

In a further embodiment, a track system for a work vehicle includes a rubber track having a groove within an inner surface of the rubber track. The inner surface is configured to contact respective support surfaces of rollers, the groove extends along an entire longitudinal extent of the inner surface, contact surfaces formed on opposite lateral sides of the groove are configured to engage corresponding raised portions of the rollers to block lateral movement of the rubber track relative to the rollers, the inner surface is substantially flat and extends to the contact surfaces, the rubber track includes alternating protrusions and recesses within the groove, and the recesses are configured to receive teeth of a sprocket to facilitate driving the rubber track in rotation.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
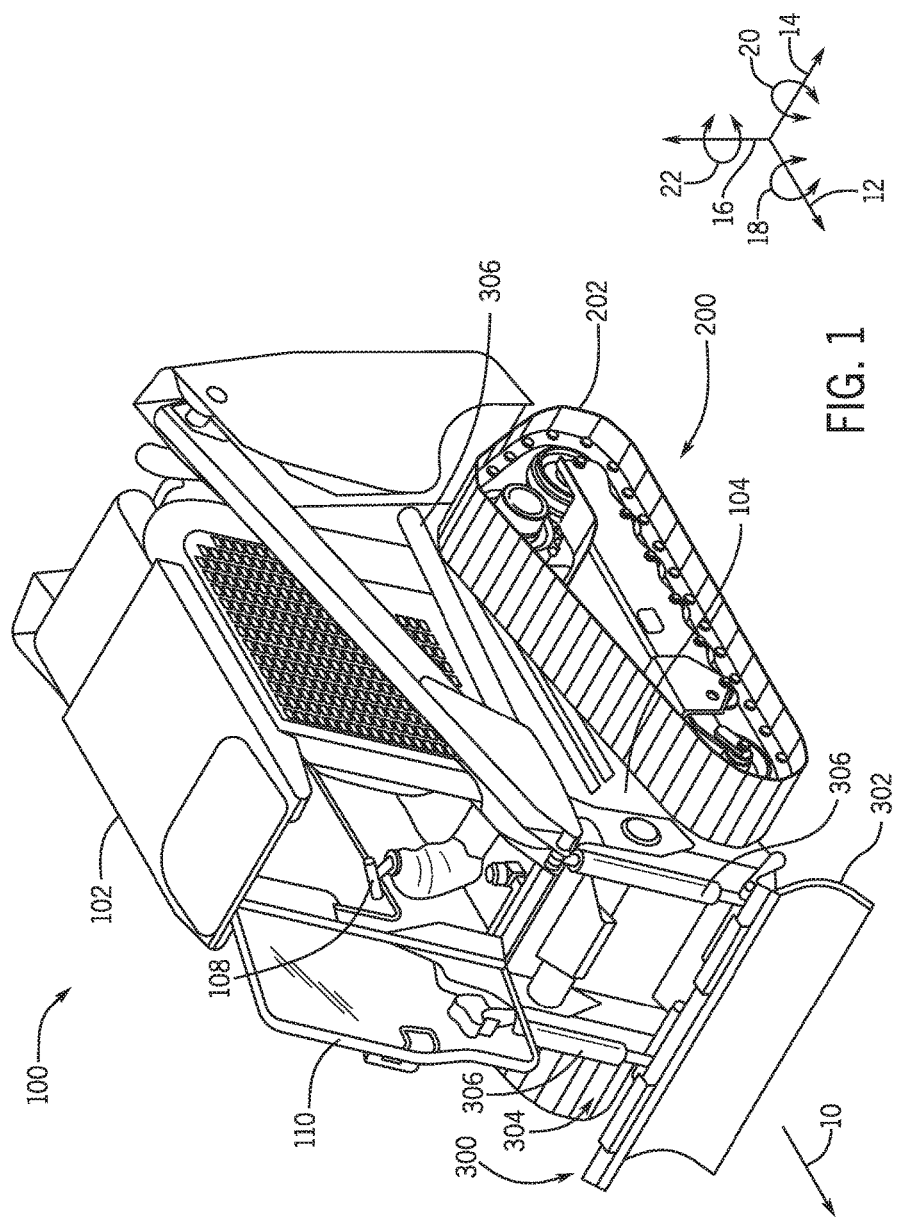
FIG. 1 is a perspective view of an embodiment of a work vehicle that may include a track system that facilitates interchanging metal and rubber tracks.

FIG. 1 is a perspective view of an embodiment of a work vehicle 100 that may include a track system 200 that facilitates interchanging metal and rubber tracks. In the illustrated embodiment, the work vehicle 100 is a compact track loader. However, it should be appreciated that the track system disclosed herein may be utilized on other work vehicles, such as tractors, harvesters, and construction equipment, among other work vehicles. In the illustrated embodiment, the work vehicle 100 includes a cab 102 and a chassis 104. In certain embodiments, the chassis 104 is configured to house a motor (e.g., diesel engine, etc.), a hydraulic system (e.g., including a pump, valves, a reservoir, etc.), and other components (e.g., an electrical system, a cooling system, etc.) that facilitate operation of the work vehicle. In addition, the chassis 104 is configured to support the cab 102 and tracks 202 of the track system 200. The tracks 202 may be driven to rotate by a drive system that may include a hydraulic motor, a transmission, other suitable drive components, or a combination thereof. As illustrated, the tracks 202 are formed from metal. However, as discussed in detail below, the track system 200 facilitates removal and replacement of the metal tracks 202 with rubber tracks, and vice versa.

The cab 102 is configured to house an operator of the work vehicle 100. Accordingly, various controls, such as the illustrated hand controller 108, are positioned within the cab 102 to facilitate operator control of the work vehicle 100. For example, the controls may enable the operator to control the rotational speed of the tracks 202, thereby facilitating adjustment of the speed and/or the direction of the work vehicle 100. In the illustrated embodiment, the cab 102 includes a door 110 to facilitate ingress and egress of the operator from the cab 102.

In the illustrated embodiment, the work vehicle 100 includes a front implement assembly 300 having a front implement, such as the illustrated dozer blade 302. As illustrated, the dozer blade 302 is positioned forward of the chassis 104 relative to a forward direction of travel 10. In addition, the front implement assembly 300 includes a front implement/arm actuator assembly 304 to control a position of the dozer blade 302 relative to the chassis 104. In the illustrated embodiment, the front implement/arm actuator assembly 304 includes hydraulic cylinders 306 configured to move the dozer blade 302 relative to the chassis 104 (e.g., the illustrated lift cylinder and the illustrated back angle cylinders, among other suitable cylinder(s), such as tilt cylinder(s) and angle cylinder(s), etc.). In addition, the front implement actuator assembly may include a valve assembly configured to control hydraulic fluid flow to the hydraulic cylinders. In certain embodiments, the front implement/arm actuator assembly 304 may be configured to move the dozer blade 302 along a longitudinal axis 12 of the work vehicle 100, along a lateral axis 14 of the work vehicle 100, along a vertical axis 16 of the work vehicle 100, or a combination thereof. In addition, the front implement/arm actuator assembly 304 may be configured to rotate the dozer blade 302 about the longitudinal axis 12 in roll 18, about the lateral axis 14 in pitch 20, about the vertical axis 16 in yaw 22, or a combination thereof. While the front implement assembly includes a dozer blade in the illustrated embodiment, it should be appreciated that in alternative embodiments, the front implement assembly may include other suitable type(s) of implement(s) (e.g., a bucket, a broom, an auger, a grapple, etc.). In addition, while the front implement/arm actuator assembly includes hydraulic cylinders in the illustrated embodiment, it should be appreciated that in alternative embodiments, the front implement/arm actuator assembly may include other suitable type(s) of actuator(s), such as hydraulic motor(s), pneumatic actuator(s), or electromechanical actuator(s), among others.

In the illustrated embodiment, the track assembly 200 is configured to enable the illustrated metal tracks and rubber tracks to be interchanged. For example, metal tracks may have greater longevity and provide more traction than rubber tracks. However, the ground speed of the work vehicle may be limited while utilizing metal tracks (e.g., to limit stress on the links between segments of the metal tracks), and the metal tracks may transmit vibrations to the cab of the work vehicle. In addition, rubber tracks may enable the work vehicle to move at a higher ground speed, and the rubber tracks may absorb vibrations, thereby increasing occupant comfort. However, the longevity and the traction of the rubber tracks may be less than the longevity and the traction of the metal tracks. Because the track assembly 200 is configured to facilitate interchanging metal tracks and rubber tracks, a track suitable for a particular operation/environment may be selected and installed, thereby enhancing the utility of the work vehicle.

In certain embodiments, the track system includes a first sprocket configured to be coupled to the drive system. The first sprocket is configured to engage a metal track and to drive the metal track in rotation. The track system also includes a second sprocket configured to be coupled to the drive system. The second sprocket is configured to engage a rubber track and to drive the rubber track in rotation. In addition, the diameter of the second sprocket is greater than the diameter of the first sprocket. The first sprocket may be coupled to the drive system while the metal track is utilized, thereby driving the metal track at a slower speed. And, the second sprocket may be coupled to the drive system while the rubber track is utilized, thereby driving the rubber track at a faster speed. By utilizing different diameter sprockets, each track may be driven at a speed that is suitable for the selected track, thereby enabling a metal track and a rubber track to be used interchangeably on the work vehicle. In addition, as discussed in detail below, the rubber track and the metal track may be particularly configured to engage a common roller assembly, thereby facilitating interchangeability of the tracks.

In certain embodiments, the drive system of the work vehicle includes a transmission configured to receive a rotational input from a drive motor of the drive system. The transmission is configured to provide a rotational output to the sprocket coupled to the drive system. In addition, the transmission is configured to shift between a first gear ratio and a second gear ratio, in which the first gear ratio is greater than the second gear ratio. The first gear ratio is configured to drive the sprocket at a first speed to drive the metal track in rotation, and the second gear ratio is configured to drive the sprocket at a second speed to drive the rubber track in rotation. By utilizing different gear ratios, each track may be driven at a speed that is suitable for the selected track, thereby enabling a metal track and a rubber track to be used interchangeably on the work vehicle. The multispeed transmission may be used in combination with the different diameter sprockets, the multispeed transmission may be used with a common sprocket for the metal and rubber tracks, or the different diameter sprockets may be used without the multispeed transmission to control the speed of the selected track. As used herein, "gear ratio" refers to the ratio of the input speed to the transmission to the output speed of the transmission (e.g., the input speed divided by the output speed).

In addition, the rubber track and the metal track may be particularly configured to engage a common roller assembly, thereby facilitating interchangeability of the tracks. For example, in certain embodiments, the rubber track has a groove within an inner surface of the rubber track. The groove extends along an entire longitudinal extent of the inner surface, and contact surfaces formed on opposite lateral sides of the groove are configured to engage corresponding raised portions of rollers of a roller assembly to block lateral movement of the rubber track relative to the rollers. In addition, the rubber track includes alternating protrusions and recesses within the groove, and the recesses are configured to receive teeth of the sprocket to facilitate driving the rubber track in rotation. The metal track also includes a groove configured to interface with the rollers of the roller assembly. Accordingly, the rubber track and the metal track may be interchangeably utilized without modification to roller assembly. As a result, the work vehicle may utilize a suitable track for the selected operation/environment.

Figure 2:
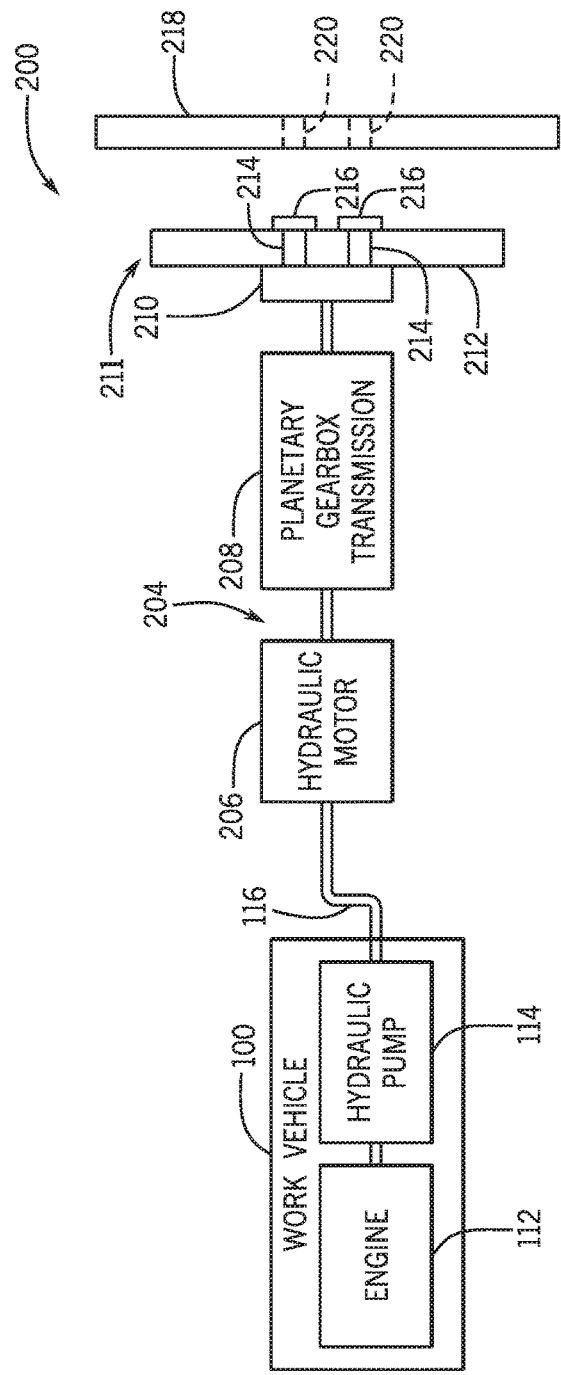
FIG. 2 is a block diagram of an embodiment of a track system that may be used on the work vehicle of FIG. 1.

FIG. 2 is a block diagram of an embodiment of a track system 200 that may be used on the work vehicle 100 of FIG. 1. In the illustrated embodiment, the work vehicle 100 includes an engine 112 and a hydraulic pump 114. The engine 112 is configured to drive the hydraulic pump 114, and the hydraulic pump 114 is configured to provide pressurized hydraulic fluid to various hydraulic components of the work vehicle (e.g., the hydraulic cylinders of the front implement assembly, etc.) and/or to hydraulic components of the track system 200. In addition, the engine may be configured to drive other components of the work vehicle, such as a generator and/or a power take-off (PTO) system. While the hydraulic pump 114 is driven by the engine 112 in the illustrated embodiment, it should be appreciated that in alternative embodiments, the hydraulic pump may be driven by other drive units, such as an electric motor.

In the illustrated embodiment, the track system 200 includes a drive system 204 configured to drive a respective track in rotation. The drive system 204 includes a hydraulic motor 206 and a planetary gearbox transmission 208. The hydraulic motor 206 is configured to receive pressurized hydraulic fluid from the hydraulic pump 114 via a conduit 116 (e.g., hose). The hydraulic motor 206 is configured to transfer energy associated with the pressurized hydraulic fluid into a rotational output. In certain embodiments, the hydraulic motor 206 includes a multispeed hydraulic motor (e.g., 2-speed hydraulic motor, 3-speed hydraulic motor, 4-speed hydraulic motor, etc.). The multispeed hydraulic motor may control the rotational speed and the torque of the rotational output based on the selected speed/ratio. For example, a first speed of a 2-speed hydraulic motor may output a lower speed and a higher torque, and the second speed of the 2-speed hydraulic motor may output a higher speed and a lower torque.

As illustrated, the planetary gearbox transmission 208 is coupled to the rotational output (e.g., output shaft) of the hydraulic motor 206. Accordingly, the hydraulic motor 206 provides a rotational input to the planetary gearbox transmission 208. The planetary gearbox transmission 208, in turn, provides a rotational output to a mounting hub 210 of a mounting system 211. The mounting hub 210 is configured to couple to a sprocket, such as the illustrated metal track sprocket 212. In the illustrated embodiment, the metal track sprocket 212 includes apertures 214 configured to receive fasteners 216 of the mounting system 211, and the fasteners 216 are configured to couple the metal track sprocket 212 to the mounting hub 210. Accordingly, in the illustrated embodiment, the metal track sprocket 212 is coupled to the drive system 204 by the mounting hub 210 and the fasteners 216. However, it should be appreciated that in alternative embodiments, the metal track sprocket may be coupled to the drive system via other mounting systems. For example, in certain embodiments, the metal track sprocket may be coupled to the mounting hub by a locking mechanism or a threaded connection, among other suitable types of connection systems. Furthermore, in certain embodiments, the mounting hub may be omitted and the mounting system (e.g., including fasteners, etc.) may directly couple the metal track sprocket to the planetary gearbox transmission (e.g., the planetary gearbox transmission may include an integrated mounting plate, etc.).

The metal track (e.g., first) sprocket 212 is configured to be coupled to the drive system 204, and the metal track sprocket 212 is configured to engage a metal track and to drive the metal track in rotation. In the illustrated embodiment, the track system 200 includes a rubber track (e.g., second) sprocket 218 configured to be coupled to the drive system 204. The rubber track sprocket 218 is configured to engage a rubber track and to drive the rubber track in rotation. As illustrated, the rubber track sprocket 218 includes apertures 220 configured to receive the fasteners 216 of the mounting system 211 to couple the rubber track sprocket 218 to the drive system 204. In the illustrated embodiment, the pattern of the apertures 220 in the rubber track sprocket 218 is substantially the same as the pattern of the apertures 214 in the metal track sprocket 212. Accordingly, the metal track sprocket 212 and the rubber track sprocket 218 are interchangeable. Furthermore, if the metal track sprocket is configured to be coupled to the drive system by another mounting system, the rubber track sprocket may be configured to be coupled to the drive system by the same mounting system to facilitate interchangeability of the sprockets.

In the illustrated embodiment, the diameter of the rubber track sprocket 218 is greater than the diameter of the metal track sprocket 212. Accordingly, rotating the rubber track sprocket 218 at a particular rotation speed drives the respective track faster than rotating the metal track sprocket 212 at the particular rotation speed. It may be desirable to rotate the metal track slower to reduce stress on the links between segments of the metal track, and it may be desirable to rotate the rubber track faster to reduce the travel time between points on the field. To couple a rubber track to the work vehicle, the metal track is removed, and then the metal track sprocket is removed (e.g. by disengaging the fasteners). Next, the rubber track sprocket is coupled to the mounting hub (e.g., by engaging the fasteners), and the rubber track is installed. Because the diameter of the rubber track sprocket is greater than the diameter of the metal track sprocket, the ground speed of the work vehicle is increased for a particular rotation speed of the sprocket, as compared to utilizing the metal track sprocket. In addition, to couple the metal track to the work vehicle, the rubber track is removed, and then the rubber track sprocket is removed (e.g. by disengaging the fasteners). Next, the metal track sprocket is coupled to the mounting hub (e.g., by engaging the fasteners), and the metal track is installed. Because the diameter of the metal track sprocket is less than the diameter of the rubber track sprocket, the ground speed of the work vehicle is reduced for a particular rotation speed of the sprocket, as compared to utilizing the rubber track sprocket.

The planetary gearbox transmission 208 may include any suitable number of gear ratios (e.g., 2, 3, 4, 5, 6, or more). For example, in certain embodiments, the planetary gearbox transmission 208 includes a first gear ratio and a second gear ratio, and the planetary gearbox transmission is configured to shift between the first and second gear ratios. The first gear ratio is configured to drive the metal track sprocket (e.g., while the metal track sprocket is coupled to the mounting hub) at a first speed to drive the metal track in rotation, and the second gear ratio is configured to drive the rubber track sprocket (e.g., while the rubber track sprocket is coupled to the mounting hub) at a second speed to drive the rubber track in rotation. In addition, the first gear ratio is greater than the second gear ratio. Accordingly, for a particular input speed to the planetary gearbox transmission, the rubber track sprocket is driven to rotate faster than the metal track sprocket. As a result of the sprocket diameter difference and the gear ratio difference, the rubber track is driven to rotate faster than the metal track for a particular output speed of the hydraulic motor.

While the planetary gearbox transmission is driven by a hydraulic motor in the illustrated embodiment, it should be appreciated that in alternative embodiments, the planetary gearbox transmission may be driven by another source, such as an electric motor or an internal combustion engine, among other suitable drive sources. In addition, while the gear ratios of the transmission are established by controlling a planetary gearbox in the illustrated embodiment, it should be appreciated that in alternative embodiments, the transmission may include other suitable gear configurations (e.g., gears mounted to counter rotating shafts, gears movable along shafts, etc.) to establish the desired gear ratios. Furthermore, in certain embodiments, the planetary gearbox transmission may be omitted. In such embodiments, the rotation speed of the tracks is controlled based on the selected sprocket (e.g., for a particular output speed of the hydraulic motor). However, in further embodiments, the metal track and the rubber track may be driven by a common sprocket, and the transmission may control the rotation speed of the respective tracks (e.g., for a particular output speed of the hydraulic motor). While a single track system is shown in the illustrated embodiment, it should be appreciated that the work vehicle may include multiple track systems (e.g., one track system on each lateral side of the work vehicle, etc.).

Figure 3A:
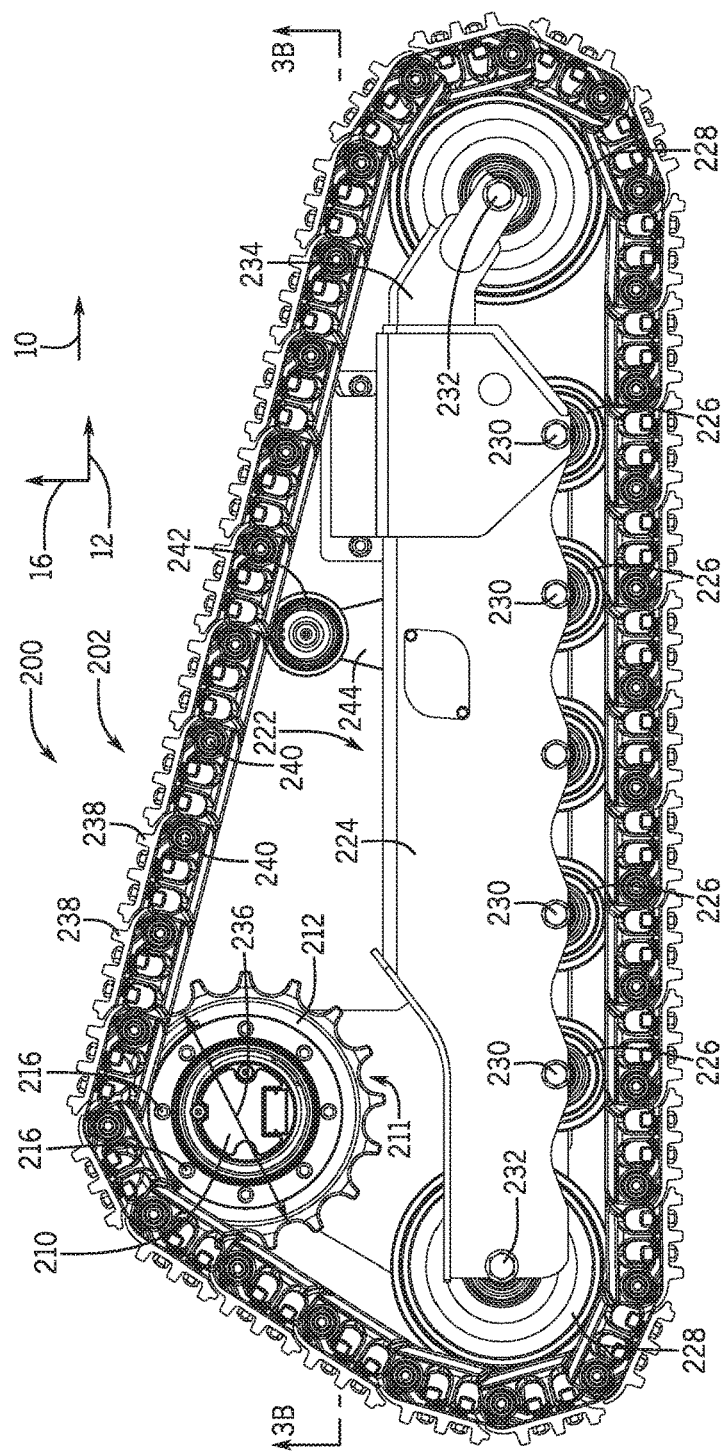
FIG. 3A is a side view of an embodiment of a track system that may be used on the work vehicle of FIG. 1, in which a metal track is disposed on a roller assembly.

FIG. 3A is a side view of an embodiment of a track system 200 that may be used on the work vehicle of FIG. 1, in which a metal track 202 is disposed on a roller assembly 222. In the illustrated embodiment, the roller assembly 222 includes a frame 224, bogie rollers 226, and idler rollers 228. As illustrated, each bogie roller 226 is rotatably coupled to the frame 224 by a respective fastener 230, and each idler roller 228 is rotatably coupled to the frame 224 by a respective fastener 232. The bogie rollers 226 are configured to distribute the weight of the work vehicle over an area of the track 202 and, as discussed in detail below, block lateral movement of the track 202 relative to the roller assembly 222. In addition, the idler rollers 228 are configured to block lateral movement of the track 202 relative to the roller assembly 222. In the illustrated embodiment, the idler roller 228 positioned at the forward end of the roller assembly 222 relative to the forward direction of travel 10 is mounted on a movable arm 234. A biasing element (e.g., a cylinder, etc.) within the frame 224 drives the movable arm along the longitudinal axis 12 in the forward direction of travel 10. As a result, the biasing element urges the two idler rollers away from one another along the longitudinal axis, thereby tensioning the track 202. Tensioning the track may urge the track 202 into contact within the rollers and the sprocket, thereby enabling the sprocket to drive the track in rotation and substantially reducing the possibility of the track separating from the roller assembly during operation of the work vehicle.

In the illustrated embodiment, the metal track sprocket 212 has a diameter 236 less than a diameter of the rubber track sprocket. Accordingly, rotating the metal track sprocket 212 at a particular rotation speed drives the metal track 202 slower than the rubber track when driven by the rubber track sprocket at the particular rotation speed. In addition, as previously discussed, the metal track sprocket 202 is coupled to the mounting hub 210 of the mounting system 211 by fasteners 216. In the illustrated embodiment, the metal track sprocket 202 is coupled to the mounting hub 210 by eight fasteners 216, which extend through eight corresponding apertures in the metal track sprocket. However, it should be appreciated that in alternative embodiments, the metal track sprocket may be coupled to the mounting hub by more or fewer fasteners, and/or other suitable type(s) of fastening system(s). In the illustrated embodiment, the metal track sprocket 212 includes teeth configured to engage corresponding recessing in the metal track 202. As illustrated, the metal track 202 is formed from segments 238 connected to one another by links 240. As discussed in detail below, each tooth may engage a corresponding recess between adjacent links, and contact between the tooth and a respective link may drive the metal track in rotation.

In the illustrated embodiment, the roller assembly 222 includes a guide roller 242 coupled to the frame 224 by a mount 244. The guide roller 242 is configured to block lateral movement of the track 202 relative to the roller assembly 222. In certain embodiments, the guide roller may be omitted. In further embodiments, the guide roller and the mount may be coupled to the frame 224 for use with the metal track and removed from the frame while a rubber track is installed.

Figure 3B:
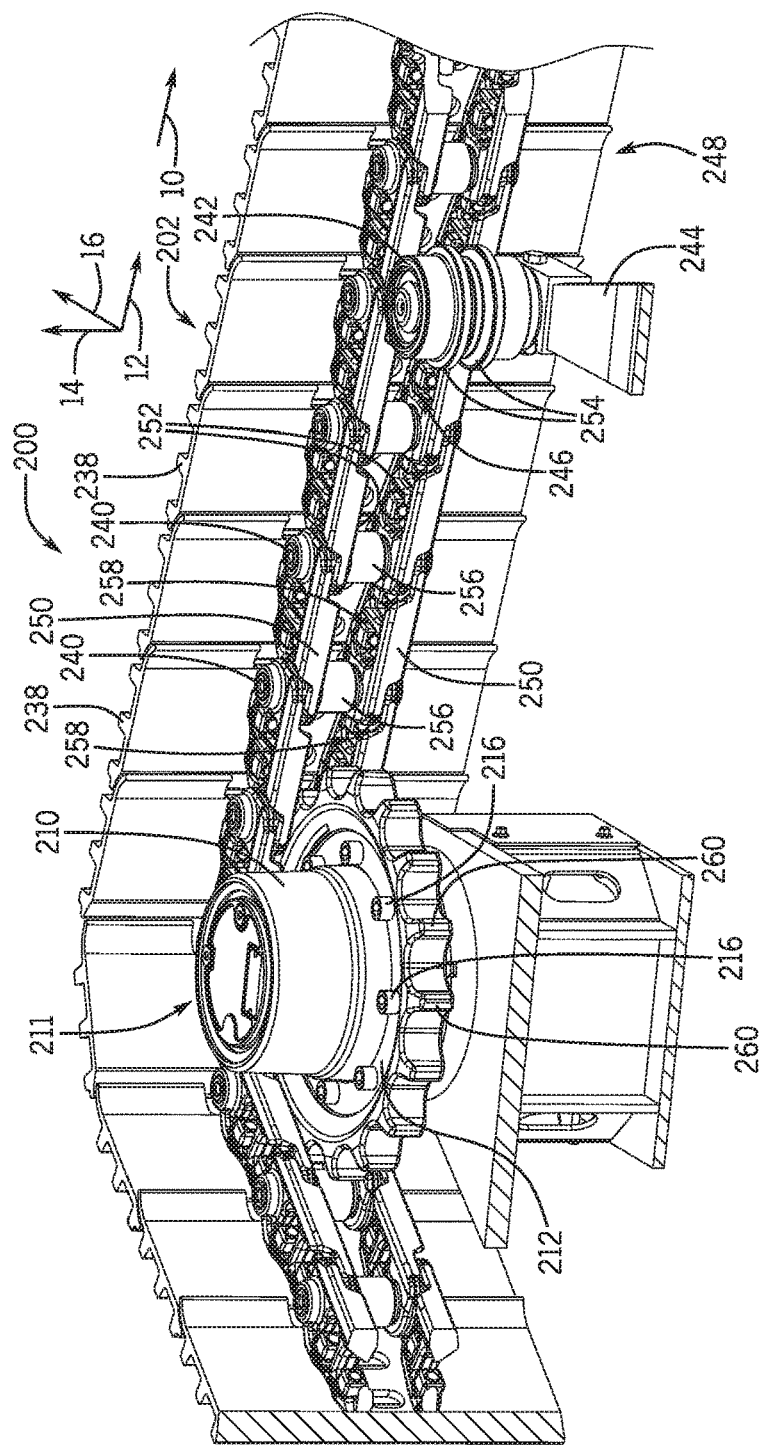
FIG. 3B is a cross-sectional view of the track system of FIG. 3A, taken along line 3B-3B.

FIG. 3B is a cross-sectional view of the track system 200 of FIG. 3A, taken along line 3B-3B. As illustrated, the metal track 202 has a groove 246 extending along an inner side 248 of the metal track 202. The groove 246 extends along the entire longitudinal extent of the inner side 248 (e.g., the entire periphery of the inner side 248 of the metal track 202 along the longitudinal axis 12). The groove 246 is formed by extensions 250 of each segment 238 of the metal track 202. As illustrated, the extensions 250 are positioned on opposite lateral sides of the groove 246 (e.g., opposite sides of the groove 246 along the lateral axis 14), thereby forming the groove 246. In addition, the extensions 250 on each lateral side of the groove 246 are interlocked with one another to establish a substantially continuous groove 246. Furthermore, the extensions 250 form contact surfaces 252 on opposite lateral sides of the groove 246 (e.g., opposite sides of the groove 246 along the lateral axis 14). The contact surfaces 252 are configured to engage corresponding raised portions of the rollers to block lateral movement of the metal track 202 relative to the roller assembly (e.g., movement of the metal track 202 along the lateral axis 14). For example, the guide roller 242 includes a raised portion 254 configured to engage the contact surfaces 252 of the extensions 250, thereby blocking lateral movement of the metal track 202 relative to the guide roller 242.

The metal track 202 also includes alternating protrusions 256 and recesses 258 within the groove 246. The recesses 258 are configured to receive teeth 260 of the metal track sprocket 212 to facilitate driving the metal track 202 in rotation. In the illustrated embodiment, the protrusions 256 are formed by the links 240, and the recesses 258 are formed between longitudinally adjacent links 256 and laterally adjacent extensions 250. However, it should be appreciated that in alternative embodiments, the protrusions and/or the recesses may be formed by other components of the metal track. While the teeth 260 of the metal track sprocket 212 are engaged with the recesses 258, rotation of the metal track sprocket 212 drives the metal track 202 in rotation via contact between the teeth 260 and the protrusions 256 (e.g., formed by the links 240).

Figure 3C:
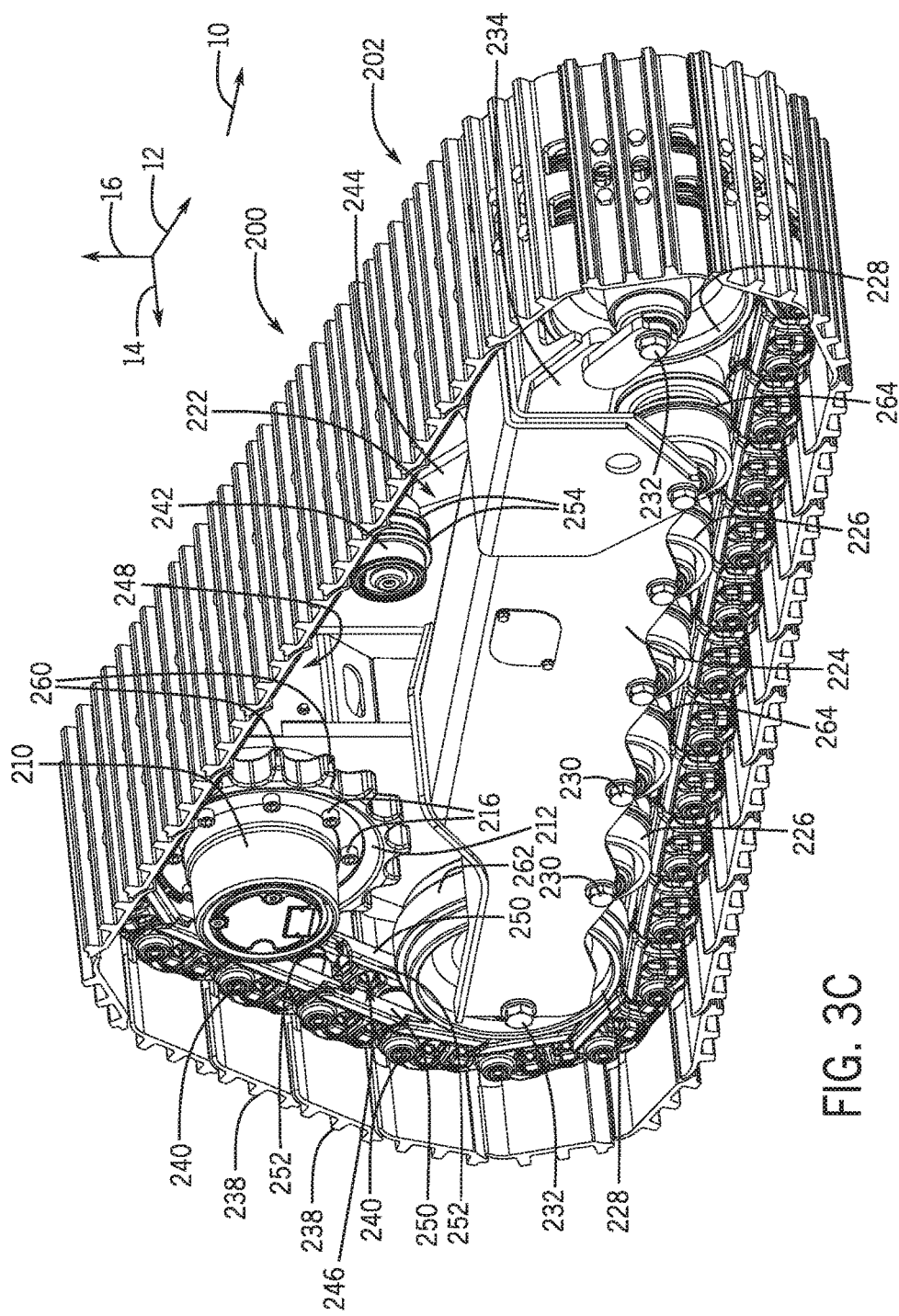
FIG. 3C is a perspective view of the track system of FIG. 3A.

FIG. 3C is a perspective view of the track system 200 of FIG. 3A. As previously discussed, contact surfaces 252 are formed on opposite lateral sides of the groove 246 and are configured to engage corresponding raised portions of the rollers to block lateral movement of the metal track 202 relative to the roller assembly (e.g., movement of the metal track 202 along the lateral axis 14). In the illustrated embodiment, each idler roller 228 includes a respective raised portion 262 configured to engage the contact surfaces 252 of the extensions 250, thereby blocking lateral movement of the metal track 202 relative to the idler rollers 228. In addition, each bogie roller 226 includes a respective raised portion 264 configured to engage the contact surfaces 252 of the extensions 250, thereby blocking lateral movement of the metal track 202 relative to the bogie rollers 226. While each bogie roller, each idler roller, and the guide roller includes a respective raised portion in the illustrated embodiment, it should be appreciated that in alternative embodiments, the raised portion may be omitted from one or more of the rollers.

If a higher ground speed and/or greater occupant comfort is desired, the metal track 202 may be removed and replaced with a rubber track. In certain embodiments, the metal track sprocket 212 may also be removed (e.g., by disengaging the fasteners 216), and the rubber track sprocket may be installed (e.g., by engaging the fasteners 216). Because the diameter of the rubber track sprocket is greater than the diameter of the metal track sprocket, the ground speed of the work vehicle is increased for a particular rotation speed of the rubber track sprocket, as compared to utilizing the metal track sprocket. Furthermore, in embodiments including a multispeed transmission (e.g., planetary gearbox transmission), the gear ratio of the transmission may be changed from a lower gear ratio to a higher gear ratio. Accordingly, for a particular input speed to the transmission, the rubber track sprocket is driven to rotate faster than the metal track sprocket. As a result of the sprocket diameter difference and the gear ratio difference, the rubber track is driven to rotate faster than the metal track for a particular input speed to the transmission.

Figure 4A:
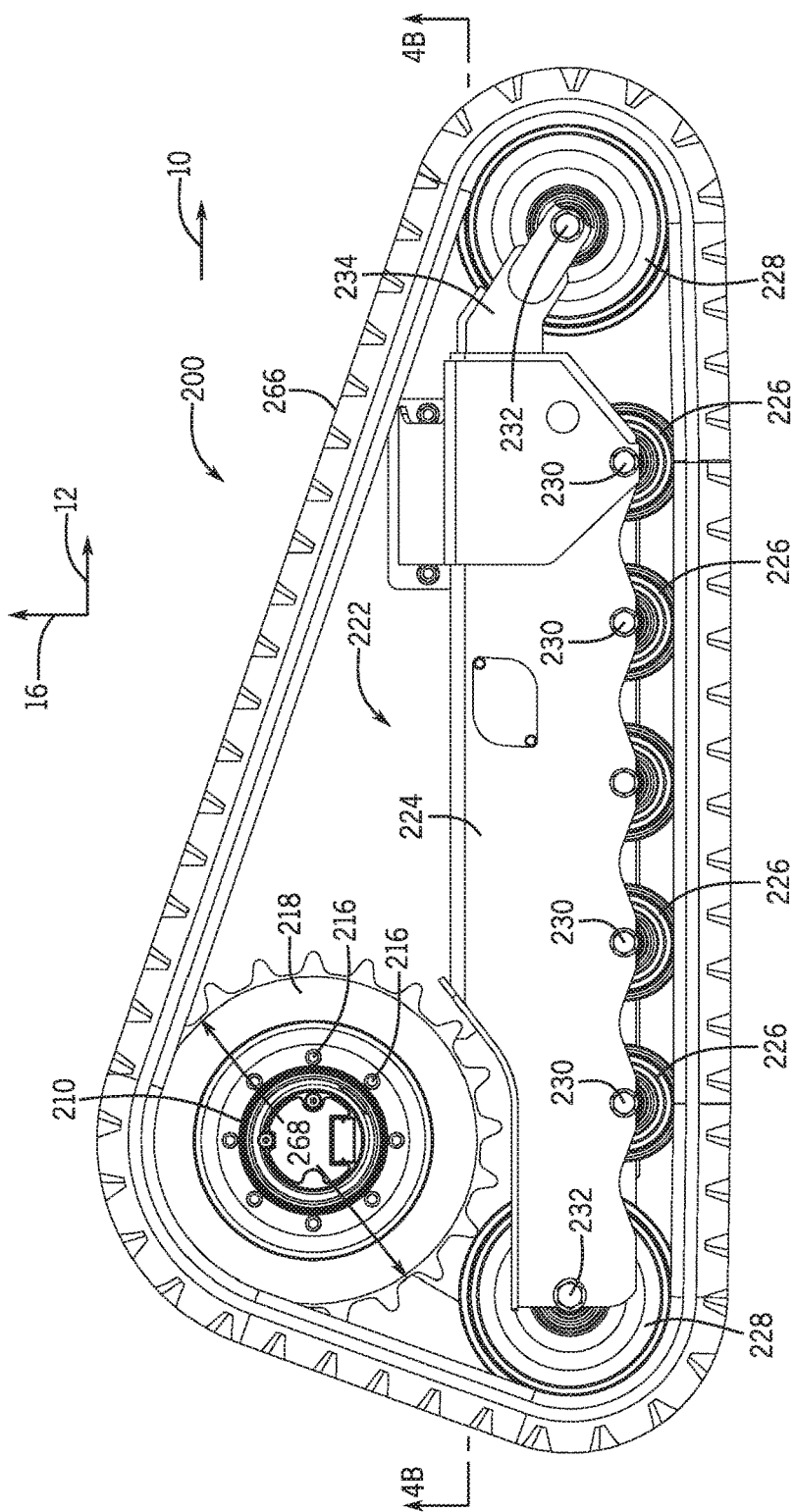
FIG. 4A is a side view of the track system of FIG. 3A, in which a rubber track is disposed on the roller assembly.

FIG. 4A is a side view of the track system 200 of FIG. 3A, in which a rubber track 266 is disposed on the roller assembly 222. In the illustrated embodiment, the rubber track 266 forms a continuous loop (e.g., along the longitudinal axis 12). However, it should be appreciated that in alternative embodiments, the rubber track may be formed from multiple segments (e.g., similar to the metal track). In addition, as used herein "rubber" refers to any resilient material suitable for forming the rubber track, such as a polymeric material, a natural rubber material, other suitable resilient materials, or a combination thereof. In addition, the rubber track may include one or more support elements (e.g., embedded within the resilient material), such as a polymeric mesh, polymeric cables, metal cables, other suitable support elements, or a combination thereof.

In the illustrated embodiment, the rubber track sprocket 218 has a diameter 268 greater than the diameter of the metal track sprocket. For example, the diameter 268 of the rubber track sprocket 218 may be between about 1.01 and about 3 times, between about 1.1 and about 2 times, between about 1.2 and about 1.5 times, or about 1.33 times greater than the diameter of the metal track sprocket. Accordingly, rotating the rubber track sprocket 218 at a particular rotation speed drives the rubber track 266 faster (e.g., 1.33 times faster) than the metal track when the metal track is driven by the metal track sprocket at the particular rotation speed. In addition, the rubber track sprocket 218 is coupled to the mounting hub 210 of the mounting system 211 by fasteners 216. In the illustrated embodiment, the rubber track sprocket 218 is coupled to the mounting hub 210 by eight fasteners 216, which extend through eight corresponding apertures in the rubber track sprocket. However, it should be appreciated that in alternative embodiments, the rubber track sprocket may be coupled to the mounting hub by more or fewer fasteners, and/or other suitable type(s) of fastening system(s). Because the pattern of the apertures in the rubber track sprocket 218 is substantially the same as the pattern of the apertures in the metal track sprocket, the metal track sprocket and the rubber track sprocket are interchangeable. Furthermore, while the guide roller is omitted (e.g., removed from the frame 224 before installation of the rubber track) in the illustrated embodiment, it should be appreciated that the guide roller may be utilized (e.g., coupled to the frame 224) in alternative embodiments.

Figure 4B:
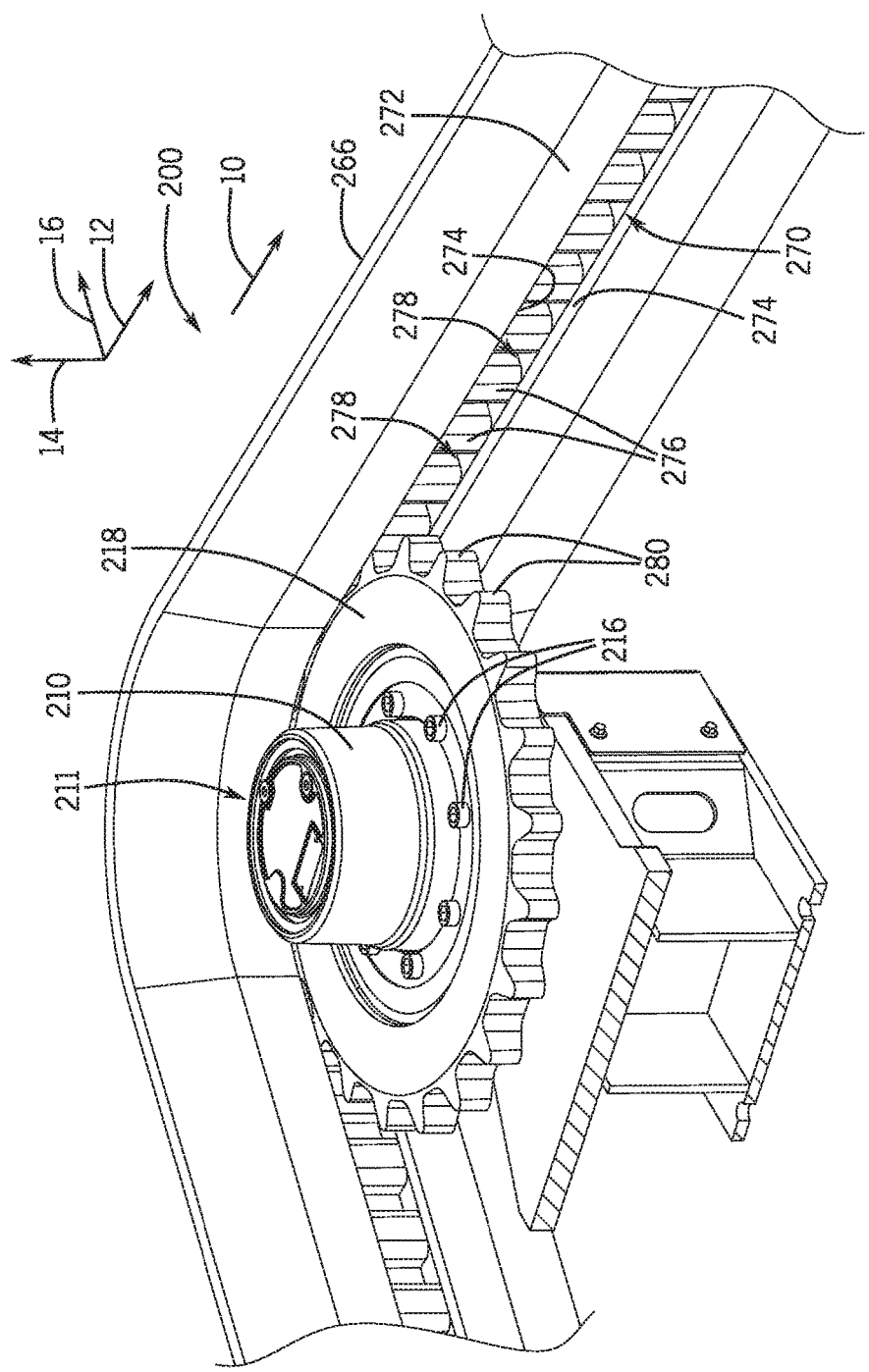
FIG. 4B is a cross-sectional view of the track system of FIG. 4A, taken along line 4B-4B.

FIG. 4B is a cross-sectional view of the track system 200 of FIG. 4A, taken along line 4B-4B. As illustrated, the rubber track 266 has a groove 270 within an inner surface 272 of the rubber track 266. As discussed in detail below, the inner surface 272 is configured to contact respective support surfaces of the rollers. The groove 270 extends along the entire longitudinal extent of the inner surface 272 (e.g., the entire periphery of the inner surface 272 of the rubber track 266 along the longitudinal axis 12). Furthermore, contact surfaces 274 are formed on opposite lateral sides of the groove 270 (e.g., opposite sides of the groove 270 along the lateral axis 14). The contact surfaces 274 are configured to engage corresponding raised portions of the rollers to block lateral movement of the rubber track 266 relative to the rollers (e.g., movement of the rubber track 266 along the lateral axis 14). As illustrated, the inner surface 272 is substantially flat and extends to the contact surfaces 274.

The rubber track 266 also includes alternating protrusions 276 and recesses 278 within the groove 270. The recesses 278 are configured to receive teeth 280 of the rubber track sprocket 218 to facilitate driving the rubber track 266 in rotation. In the illustrated embodiment, the protrusions 276 and the recesses 278 are formed by a series of substantially equally spaced cavities within the inner surface 272 of the rubber track 266. However, it should be appreciated that in alternative embodiments, the protrusions and/or the recesses may be formed by other techniques and/or structures. While the teeth 280 of the rubber track sprocket 218 are engaged with the recesses 278, rotation of the rubber track sprocket 218 drives the rubber track 266 in rotation via contact between the teeth 280 and the protrusions 276.

Figure 4C:
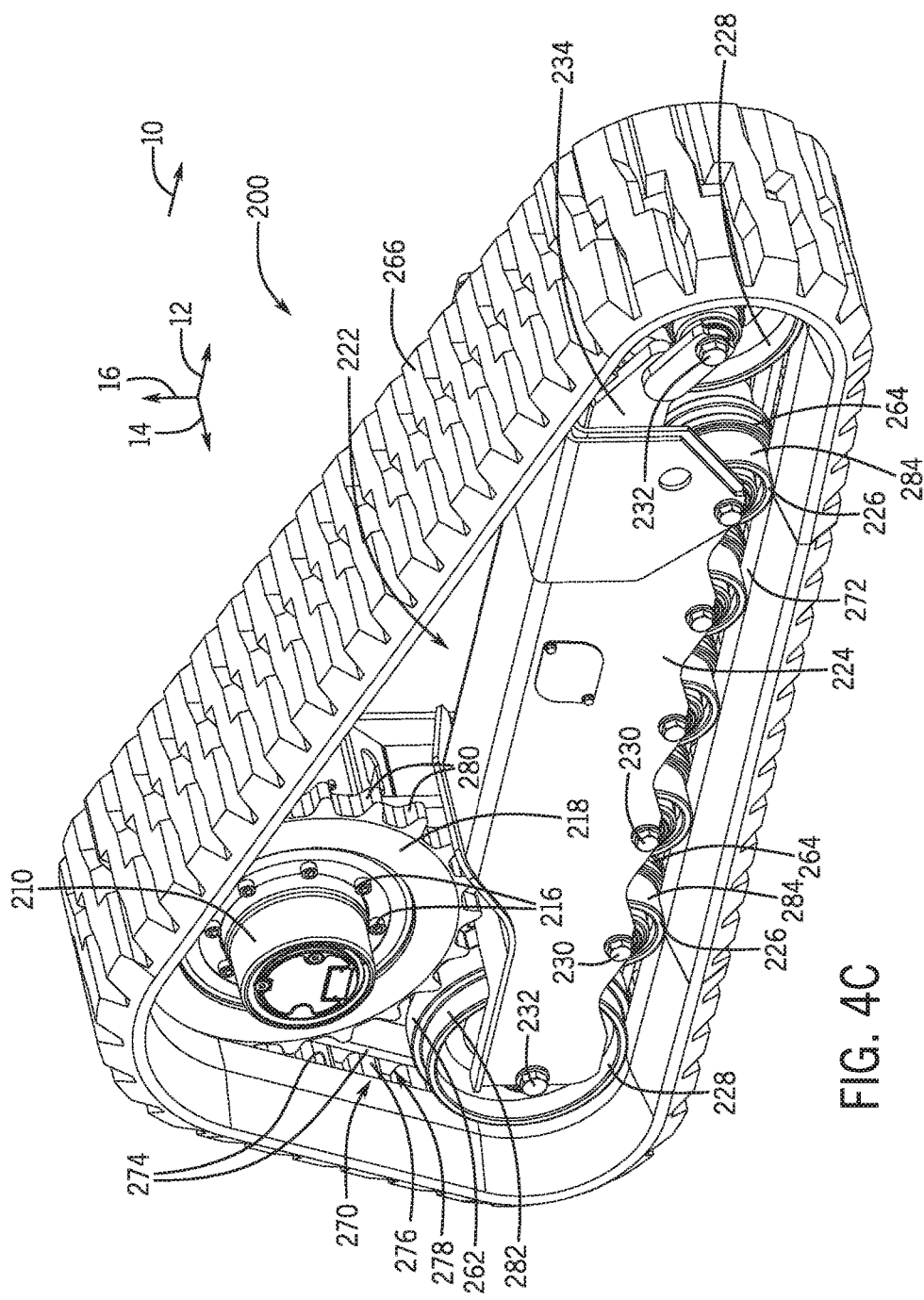
FIG. 4C is a perspective view of the track system of FIG. 4A.

FIG. 4C is a perspective view of the track system 200 of FIG. 4A. As previously discussed, the inner surface 272 is substantially flat and extends to the contact surfaces 274. In addition, the inner surface 272 is configured to contact a support surface 282 of each idler roller 228 and a support surfaces 284 of each bogie roller 226. Furthermore, the contact surfaces 274 formed on opposite lateral sides of the groove 270 are configured to engage corresponding raised portions of the rollers to block lateral movement of the rubber track 266 relative to the roller assembly (e.g., movement of the rubber track 266 along the lateral axis 14). In the illustrated embodiment, the raised portion 262 of each idler roller 228 is configured to engage the contact surfaces 274 of the rubber track 266, thereby blocking lateral movement of the rubber track 266 relative to the idler rollers 228. In addition, the raised portion 264 of each bogie roller 226 is configured to engage the contact surfaces 274 of the rubber track 266, thereby blocking lateral movement of the rubber track 266 relative to the bogie rollers 226. While each bogie roller and each idler roller includes a respective raised portion in the illustrated embodiment, it should be appreciated that in alternative embodiments, the raised portion may be omitted from one or more of the rollers.

If greater longevity and/or more traction is desired, the rubber track 266 may be removed and replaced with a metal track. In certain embodiments, the rubber track sprocket 218 may also be removed (e.g., by disengaging the fasteners 216), and the metal track sprocket may be installed (e.g., by engaging the fasteners 216). Because the metal track and the rubber track are configured to engage common rollers (e.g., the idler rollers and the bogie rollers) of the roller assembly, the tracks may be interchanged on the roller assembly. Accordingly, a track suitable for a particular operation/environment may be selected and installed, thereby enhancing the utility of the work vehicle.

Figure 5:
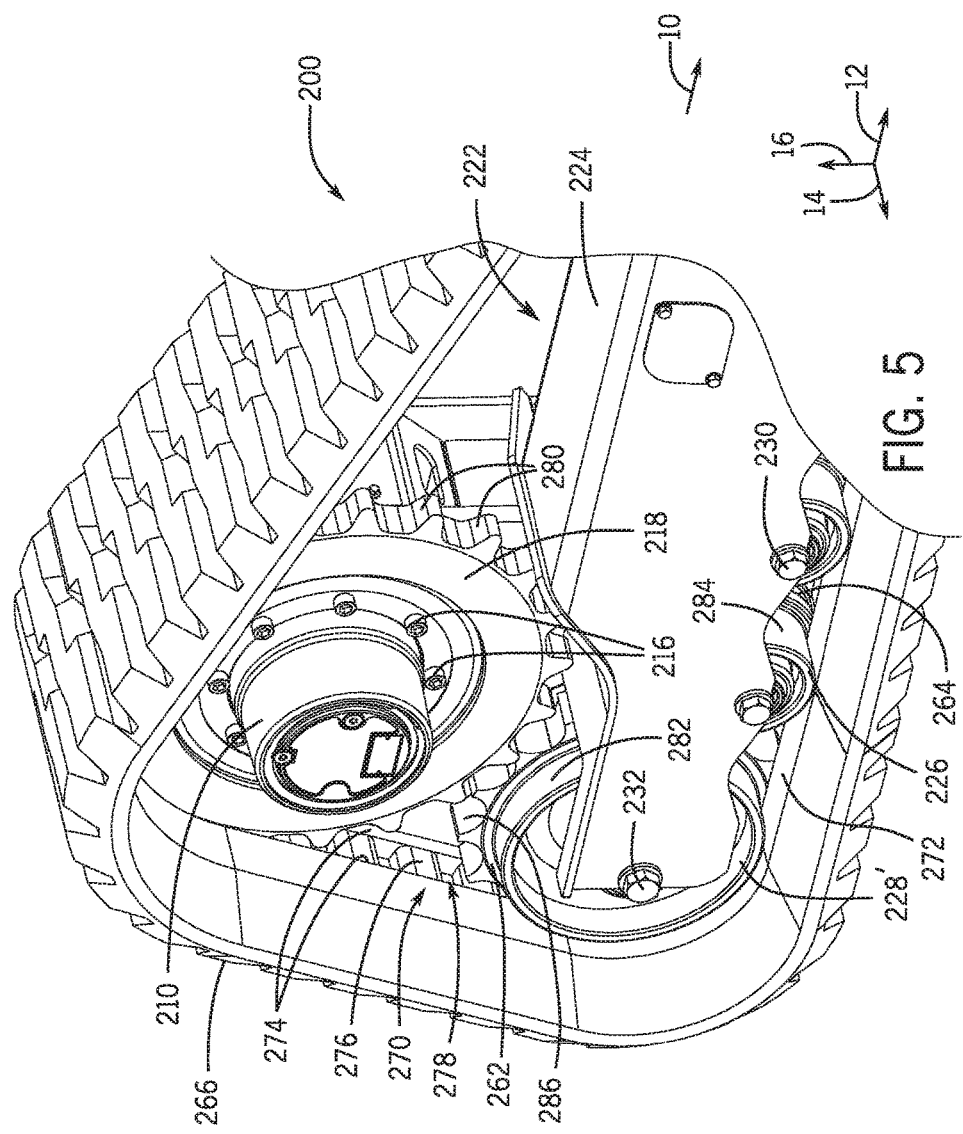
FIG. 5 is a perspective view of the track system of FIG. 4A, including an alternative embodiment of an idler roller.

FIG. 5 is a perspective view of the track system 200 of FIG. 4A, including an alternative embodiment of an idler roller 228'. In the illustrated embodiment, the rear idler roller 228' includes teeth 286 on the raised portion 262 of the idler roller 228'. The teeth 286 are configured to engage the recesses 278 within the groove 270 of the rubber track 266.

While a tooth of the idler roller 228' is engaged with (e.g., disposed within) a respective recess 278, contact between lateral sides of the tooth and corresponding lateral sides of the recess block lateral movement of the rubber track 266 relative to the idler roller 228' (e.g., movement of the rubber track 266 along the lateral axis 14). While the rear idler roller 228' includes teeth in the illustrated embodiment, it should be appreciated that in certain embodiments, the front idler roller and/or one or more bogie rollers 226 may include teeth (e.g., in addition to the toothed rear idler roller or as an alternative to the toothed rear idler roller). The teeth of the roller(s) are also configured to engage the recesses 258 of the metal track 202 to facilitate interchangeability of the metal track and the rubber track.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A track system for a work vehicle, comprising:
   a first sprocket having a first diameter, wherein the first sprocket is configured to be coupled to a drive system of the work vehicle, and the first sprocket is configured to engage a metal track and to drive the metal track in rotation; and
   a second sprocket having a second diameter, wherein the second sprocket is configured to be coupled to the drive system of the work vehicle, and the second sprocket is configured to engage a rubber track and to drive the rubber track in rotation;
   wherein the first and second sprockets are configured to engage a mounting system, the mounting system is configured to interchangeably couple the first and second sprockets to the drive system, and the second diameter of the second sprocket is greater than the first diameter of the first sprocket.

2. The track system of claim 1, wherein the first sprocket includes teeth configured to engage corresponding recesses in the metal track, and the second sprocket includes teeth configured to engage corresponding recesses in the rubber track.

3. The track system of claim 1, wherein the first sprocket includes apertures configured to receive fasteners of the mounting system to couple the first sprocket to the drive system, and the second sprocket includes apertures configured to receive the fasteners to couple the second sprocket to the drive system.

4. The track system of claim 1, comprising a transmission of the drive system configured to receive a rotational input from a drive motor of the drive system and to provide a rotational output to the first sprocket or to the second sprocket, wherein the transmission is configured to shift between a first gear ratio and a second gear ratio, the first gear ratio is configured to drive the first sprocket at a first speed to drive the metal track in rotation, the second gear ratio is configured to drive the second sprocket at a second speed to drive the rubber track in rotation, and the first gear ratio is greater than the second gear ratio.

5. The track system of claim 4, comprising the drive motor of the drive system, wherein the drive motor comprises a multispeed hydraulic motor.

6. The track system of claim 1, comprising the rubber track, wherein the rubber track has a groove within an inner surface of the rubber track, the groove extends along an entire longitudinal extent of the inner surface, contact surfaces formed on opposite lateral sides of the groove are configured to engage corresponding raised portions of rollers to block lateral movement of the rubber track relative to the rollers, the rubber track includes alternating protrusions and recesses within the groove, and the recesses are configured to receive teeth of the second sprocket to facilitate driving the rubber track in rotation.

7. The track system of claim 6, comprising the rollers, wherein the rollers comprise at least one bogie roller and at least one idler roller, and each of the at least one bogie roller and the at least one idler roller includes a respective raised portion of the corresponding raised portions, and the respective raised portion of the at least one bogie roller and the respective raised portion of the at least one idler roller are configured to engage opposite lateral sides of a groove within the metal track to block lateral movement of the metal track relative to the rollers.

8. The track system of claim 1, wherein a ratio of the second diameter of the second sprocket to the first diameter of the first sprocket is about 1.33.

9. A track system for a work vehicle, comprising:
   a drive system, comprising:
   a transmission configured to receive a rotational input from a drive motor of the drive system and to provide a rotational output to at least one sprocket, wherein the transmission is configured to shift between a first gear ratio and a second gear ratio, the first gear ratio is configured to drive the at least one sprocket at a first speed to drive a metal track in rotation, the second gear ratio is configured to drive the at least one sprocket at a second speed to drive a rubber track in rotation, and the first gear ratio is greater than the second gear ratio.

10. The track system of claim 9, wherein the drive system comprises the drive motor, and the drive motor comprises a multispeed hydraulic motor.

11. The track system of claim 9, wherein the at least one sprocket includes teeth configured to engage corresponding recesses in the metal track and in the rubber track.

12. The track system of claim 9, comprising:
   a first sprocket of the at least one sprocket having a first diameter, wherein the first sprocket is configured to be coupled to the drive system, and the first sprocket is configured to engage the metal track and to drive the metal track in rotation;
   a second sprocket of the at least one sprocket having a second diameter, wherein the second sprocket is configured to be coupled to the drive system, and the second sprocket is configured to engage the rubber track and to drive the rubber track in rotation; and
   the rubber track having a groove within an inner surface of the rubber track, wherein the groove extends along an entire longitudinal extent of the inner surface, contact surfaces formed on opposite lateral sides of the groove are configured to engage corresponding raised portions of rollers to block lateral movement of the rubber track relative to the rollers, the rubber track includes alternating protrusions and recesses within the groove, and the recesses are configured to receive teeth of the second sprocket to facilitate driving the rubber track in rotation;
   wherein the first and second sprockets are configured to engage a mounting system, the mounting system is configured to interchangeably couple the first and second sprockets to the drive system, and the second diameter of the second sprocket is greater than the first diameter of the first sprocket.

13. The track system of claim 12, comprising the rollers, wherein the rollers comprise at least one bogie roller and at least one idler roller, and each of the at least one bogie roller and the at least one idler roller includes a respective raised portion of the corresponding raised portions, and the respective raised portion of the at least one bogie roller and the respective raised portion of the at least one idler roller are configured to engage opposite lateral sides of a groove within the metal track to block lateral movement of the metal track relative to the rollers.

14. The track system of claim 12, wherein the first sprocket includes apertures configured to receive fasteners of the mounting system to couple the first sprocket to the drive system, and the second sprocket includes apertures configured to receive the fasteners to couple the second sprocket to the drive system.

15. The track system of claim 12, wherein a ratio of the second diameter of the second sprocket to the first diameter of the first sprocket is about 1.33.

16. A track system for a work vehicle, comprising:
a plurality of rollers comprising at least one bogie roller and at least one idler roller; and
a rubber track having a groove within an inner surface of the rubber track, wherein the inner surface is configured to contact respective support surfaces of each of the at least one bogie roller and at least one idler roller, the groove extends along an entire longitudinal extent of the inner surface, contact surfaces formed on opposite lateral sides of the groove are configured to engage corresponding raised portions of each of at least one bogie roller and at least one idler roller to block lateral movement of the rubber track relative to the rollers, the inner surface is substantially flat and extends to the contact surfaces, the rubber track includes alternating protrusions and recesses within the groove, and the recesses are configured to receive teeth of a sprocket to facilitate driving the rubber track in rotation,
wherein each of the at least one bogie roller and the at least one idler roller includes a respective raised portion of the corresponding raised portions, and
wherein the respective raised portion of the at least one bogie roller and the respective raised portion of the at least one idler roller are configured to engage opposite lateral sides of a groove within a metal track to block lateral movement of the metal track relative to the rollers.

17. The track system of claim 16, comprising the metal track, wherein the metal track has a groove extending along an inner side of the metal track, the groove of the metal track extends along an entire longitudinal extent of the inner side, contact surfaces formed on opposite lateral sides of the groove of the metal track are configured to engage the corresponding raised portions of the rollers to block lateral movement of the metal track relative to the rollers, the metal track includes alternating protrusions and recesses within the groove of the metal track, and the recesses of the metal track are configured to receive the teeth of the sprocket to facilitate driving the metal track in rotation.

18. A track system for a work vehicle, comprising:
a rubber track having a groove within an inner surface of the rubber track, wherein the inner surface is configured to contact respective support surfaces of rollers, the groove extends along an entire longitudinal extent of the inner surface, contact surfaces formed on opposite lateral sides of the groove are configured to engage corresponding raised portions of the rollers to block lateral movement of the rubber track relative to the rollers, the inner surface is substantially flat and extends to the contact surfaces, the rubber track includes alternating protrusions and recesses within the groove, and the recesses are configured to receive teeth of a sprocket to facilitate driving the rubber track in rotation; and
a drive system, comprising:
a drive motor; and
a transmission configured to receive a rotational input from the drive motor of the drive system and to provide a rotational output to the sprocket,
wherein the transmission is further configured to shift between a first gear ratio and a second gear ratio,
wherein the first gear ratio is configured to drive the sprocket at a first speed to drive a metal track in rotation,
wherein the second gear ratio is configured to drive the sprocket at a second speed to drive the rubber track in rotation, and
wherein the first gear ratio is greater than the second gear ratio.

19. The track system of claim 18, wherein the drive system comprises the drive motor, and the drive motor comprises a multispeed hydraulic motor.

* * * * *